Oct. 12, 1954

R. PILLSBURY 2,691,307

SPROCKET ADJUSTER

Filed May 23, 1951

Inventor
Russell Pillsbury
By
Attorney

Oct. 12, 1954

R. PILLSBURY 2,691,307

SPROCKET ADJUSTER

Filed May 23, 1951

Inventor
Russell Pillsbury
By
Richmond A. Hayes
Attorney

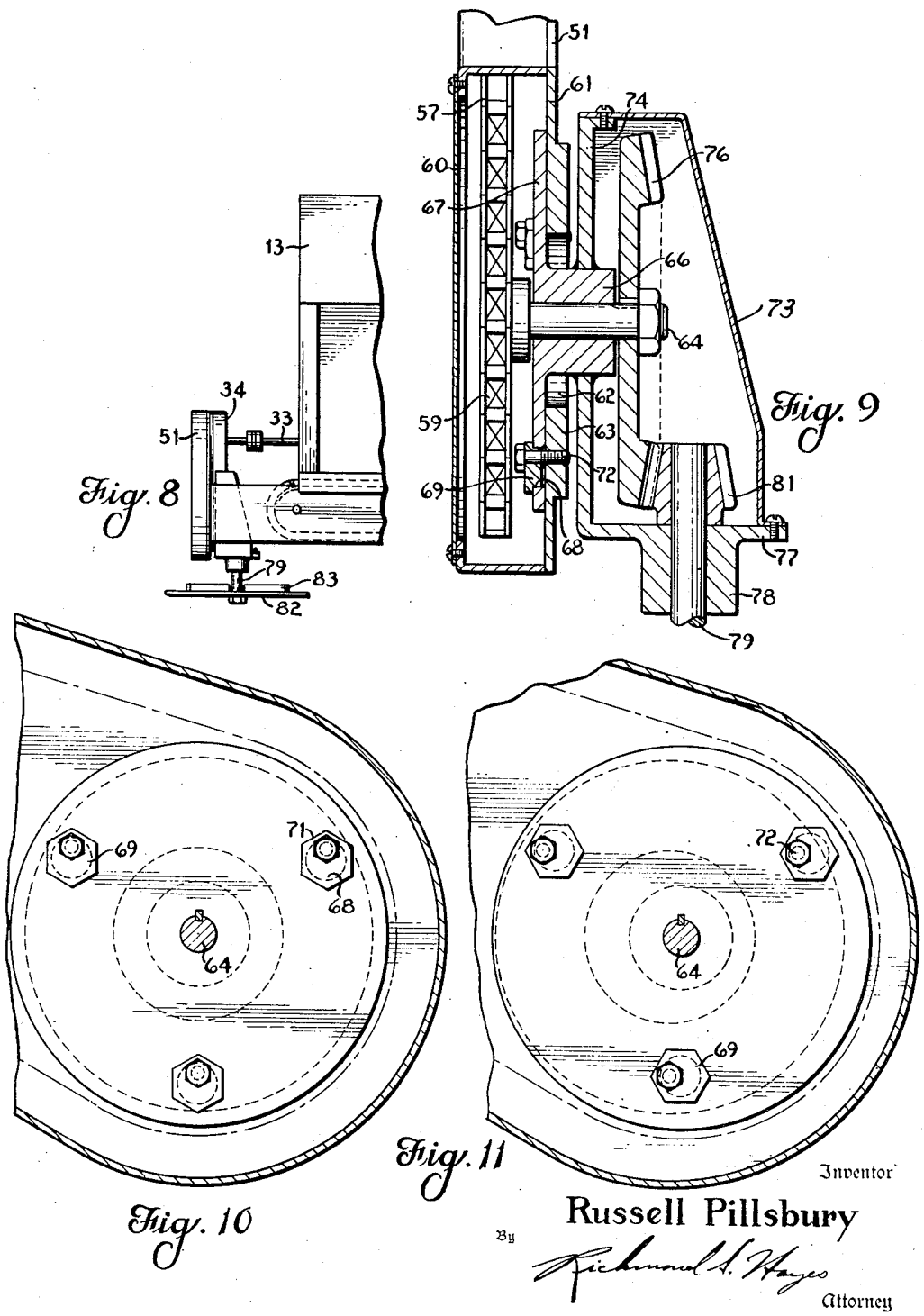

Patented Oct. 12, 1954

2,691,307

UNITED STATES PATENT OFFICE 2,691,307

SPROCKET ADJUSTER

Russell Pillsbury, Jamestown, N. Y.

Application May 23, 1951, Serial No. 227,819

3 Claims. (Cl. 74—242.16)

1

This invention relates to devices for spreading finely particled material, such as fertilizer. More particularly, the invention relates to a device for this purpose that is self-contained to the extent that it will carry a considerable quantity of the material to be spread and feed such material at a predetermined rate to a given rear exit, at which point a power driven rotary spreader uniformly distributes the material over a wide area.

All mechanisms for its operation, as well as a source of power, are carried by and constitute a part of the device. Further, the device is intended to be mounted upon a truck or other vehicle chassis and needs only the connection of mechanism and power control to give an operator of the vehicle, on which it is mounted, full, operative management in distributing the material.

An object of the invention lies in the provision of a self-contained device for use in the controlled spreading or distributing of materials, such as fertilizer.

Another object of the invention lies in the provision of a carrier or hopper from which material is fed rearwardly to an exit, at which point it drops onto a rotating disk in such a manner as to be spread or cast to the rear and sides of the device.

A still further object of the invention lies in the provision of a load carrying body, adapted for mounting on a truck chassis, that includes a material conveyor and rotatable spreading disk, both of these mechanisms being operated by a small power plant carried by the body.

Another and further object of the invention lies in the provision of mechanisms for driving a material conveyor and distributor that may be readily assembled and disassembled as may be required in adjusting, changing or replacing such operative parts as are subjected to considerable strain or wear.

Other objects and advantages of the invention will be more fully understand from a consideration of the following specification, taken in conjunction with the accompanying drawing; in which Fig. 1 is a fragmentary plan view showing the structure of the invention as incorporated in a load carrying vehicle body;

2

Figure 2:
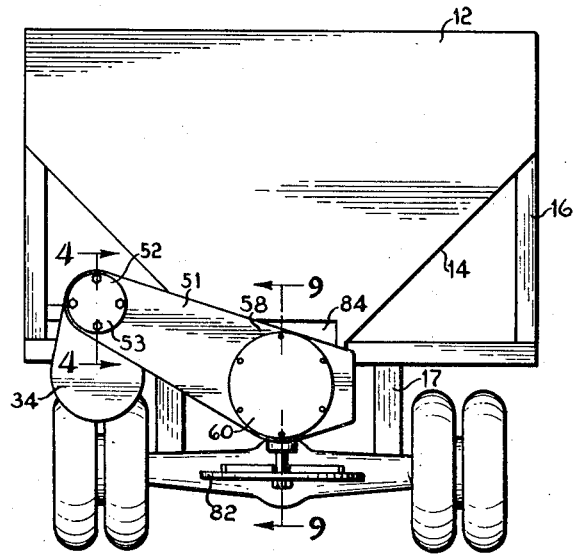
Fig. 2 is a rear elevational view showing the body in mounted position on a truck chassis and also discloses the location of certain of the operative mechanisms.
Figure 3:
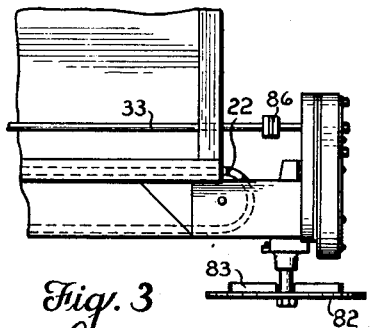
Fig. 3 is a fragmentary side elevational view of the rotary material spreader and associated driving mechanism.
Figure 4:
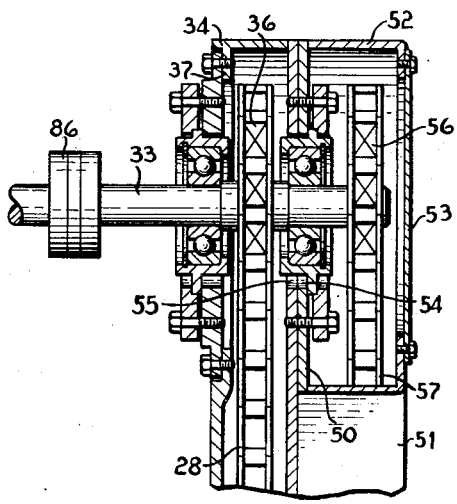
Figure 5:
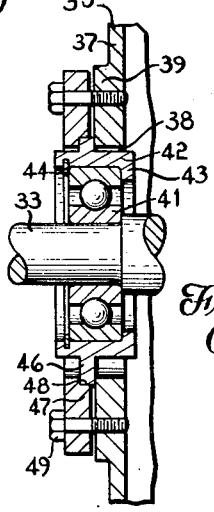
Figure 6:
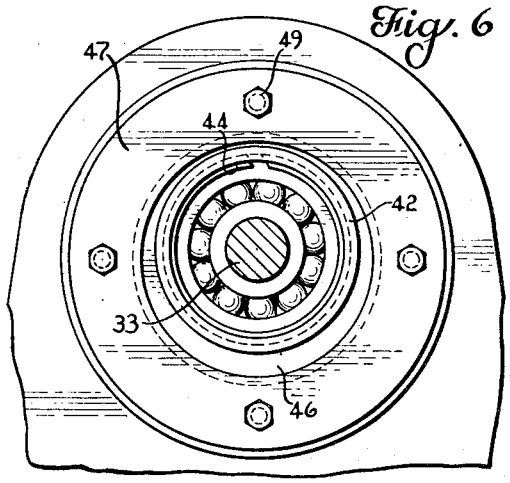
Figure 7:
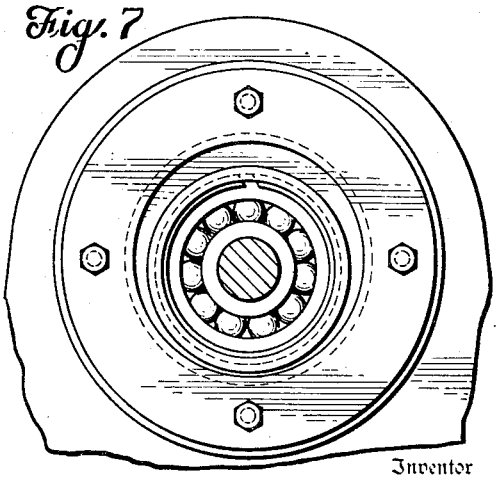

Fig. 4 is an enlarged fragmentary vertical sectional view of part of the driving mechanism shown in Fig. 3, being taken substantially on the line 4—4 of Fig. 2;

Fig. 5 is an enlarged fragmentary sectional view of a part of the structure of Fig. 4 and shows, with greater clarity, details of the chain adjusting mechanism of that figure;

Figs. 6 and 7 are fragmentary rear elevational views showing two positions of the chain conveyor adjusting mechanism illustrated in section in Fig. 5;

Fig. 8 is a fragmentary side elevational view of the rotary material spreader and drive mechanism, being taken from the side opposite that shown in Fig. 3;

Fig. 9 is an enlarged fragmentary vertical sectional view of a further part of the driving mechanism, being taken substantially on the line 9—9 of Fig. 2; and Figs. 10 and 11 are fragmentary rear elevational views showing two positions of adjustment for the chain carrying structure directly associated with the rotary spreader.

Referring more particularly to the drawing, the reference numeral 10 is employed to generally designate a vehicle body on which are incorporated the various featues of the invention. This body, for general purposes of illustration, may be formed with the usual front and rear walls 11 and 12, respectively. The side walls 13 extend vertically downwardly a short distance and thence inwardly, as at 14, to provide a sloped wall bin or container for the material it is desired to distribute. Any suitable supporting structure, such as indicated at 16, may be employed to rigidify the body, as well as provide a means by which the body may be conveniently attached to a truck chassis 17. The bottom of the body, between the sloped walls 14, is open, as at 18, and set into this opening is a conveyor 19. The conveyor may be of any desired type and is herein shown to consist of front and rear pairs of sprockets 21 and 22. These sprockets mount chains 23 which are connected by cross members 24 that travel over a bottom plate 25. The rear sprockets 22 are mounted on a shaft 26 that extends transversely along the rear wall 12 of the body into a gear case 27. The specific gears for driving the shaft 26 are not shown, but a conventional pair of bevelled gears would be entirely suitable, a shaft from one of these gears extending to the rear of the casing and mounting a sprocket which is driven by a chain 28. It is not the purpose of the invention to provide any special reduction drive from a power source to the conveyor but, rather, to merely illustrate this driving connection and present the invention as providing means for connecting the conveyor drive with a power source.

Figure 1:
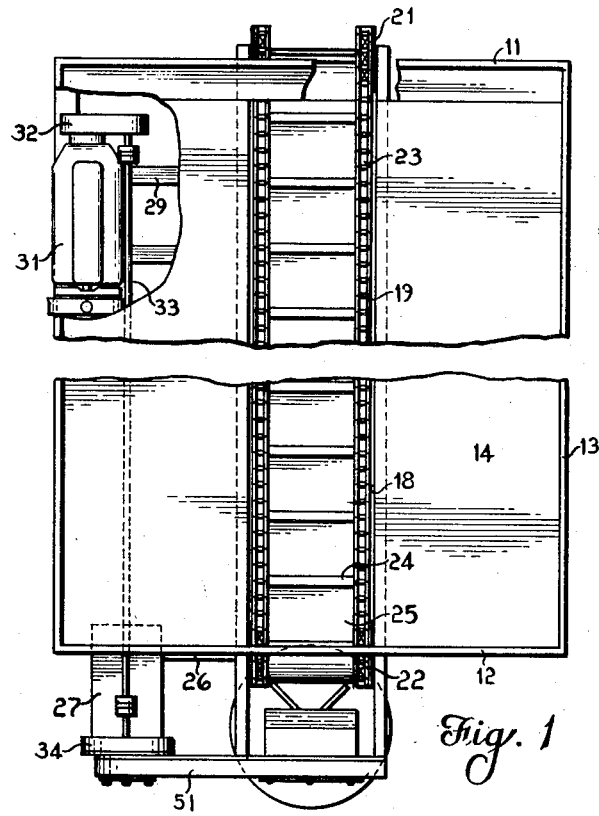

Referring particularly to Fig. 1, it will be noted that the body is fitted with a side frame 29 on which is located a small power unit 31. At the forward end of this unit is a reduction drive mechanism 32. Extending rearwardly from this mechanism is a drive shaft 33. This shaft projects into a vertically positioned housing 34 that is located at the rear end of the gear case 27. It will be understood from the drawings that the power unit 31, gear reduction 32, and drive shaft 33 are so proportioned and arranged as to be located in their entirety within the lateral limits of the body and in the space beneath one of the inclined walls 14 of said body.

The housing 34, indicated in Fig. 2, at its lower end encloses the aforementioned sprocket that forms a part of the gear mechanism for driving the conveyor. Since the conveyor drive is a speed reducing mechanism, a smaller sprocket 36 is located in the upper end of the housing 34 and the chain 28 connects these sprockets. The sprocket 36 is mounted on an end of the drive shaft 33. The forward wall 37 of the housing 34 is formed with an opening 38 that is defined by a reinforcing flange 39. It is through this opening that the shaft 33 extends. The shaft is shown to be mounted in a ball bearing unit 41. The outer race of this bearing is secured to the inner wall of a sleeve 42. Inwardly of the sleeve opening is a flange 43 which provides a shoulder against which the inner edge of the bearing outer race abuts. The bearing is held in the sleeve against the flange in any suitable manner, such as suggested by the split locking ring 44. Extending radially outwardly from the sleeve is an eccentric flange 46. An inner edge of this flange is adapted to abut the outer face of the flange 39. A collar plate 47 has an interior annular shoulder 48 that engages the outer face and circumferential edge of the eccentric flange 46. Flange 39 may be drilled and tapped and collar plate 47 secured thereto by studs 49. When these studs are turned down, the plate 47 locks the sleeve 42 against rotation and so supports the bearing 41 that it in turn will hold the shaft 33 in a given operative position.

A housing 51 is provided which, as suggested in Fig. 2 of the drawing, is joined at its upper, narrow end 52 to the upper end of the housing 34 and extends downwardly at an incline to terminate on center with the longitudinal center of the body 10. For the moment, attention is particularly directed to this upper end 52 of this housing. Any suitable rear cover plate, such as suggested at 53, is provided to give assembly access to the housing interior. The front wall 50 of the housing end 52 is formed with an opening 54 that matches a similar opening 55 in the rear wall of the housing 34. An end of the shaft 33 projects through these openings into the housing end 52, being mounted by parts identical with those previously described. Herein, however, the bearing 41 is carried by a sleeve 42 that is reversed to the previously described sleeve, and the eccentric flange 46 of this sleeve is held between a collar plate 47, located within the housing, and the forward housing wall, by means of studs 49. The end of shaft 33 mounts a sprocket 56 which is engaged by a chain 57. It is thus apparent that, through sprocket 36 and chain 28, power is transmitted from the drive shaft 33 to the conveyor and that power, through sprocket 56 and chain 57, is intended to operate the rotary spreader.

The lower, enlarged end 58 of the housing 51 encloses a sprocket 59. The forward wall 61 of this portion of the housing is formed with a circular opening 62 that is defined by an integral, reinforcing collar 63. One end of a stub shaft 64 mounts the sprocket 59. This shaft projects through and is carried by a hub 66. The hub projects through the opening 62, and, within the end 58, takes the form of a flat disk 67 that lies against the inner face of the collar 63. In the present disclosure, three circular openings 68 are made in this disk, being arranged to form a triangle about the shaft. A plug 69 projects into each opening 68 and includes a hexagonal head 71. An eccentrically located opening is made through each plug for the purpose of receiving a stud 72. The threaded ends of these studs project into tapped openings in the collar 63.

The outer end of the hub 66 projects into a housing 73 through a reinforced inner wall 74, being permanently secured thereto. The outer end of the shaft 64 extends into housing 73 and mounts a ring gear 76. The lower wall 77 of this housing is also of substantial proportions and includes a depending boss 78. A vertical shaft 79 extends through the boss into the housing 73 and mounts a gear 81 which meshes with the ring gear 76. Attached to the lower end of the shaft 79 is a disk 82 that includes upright vanes 83.

Having set forth the structure of the invention, the following describes the useful operative features thereof. It is, of course, well known that small particled fertilizer, such as lime, is highly abrasive and that all operative parts in the vicinity of such material are subjected to considerable wear and deterioration. Such operative parts are, of course, the drive mechanisms for the conveyor and spreader. It is known from past usage that the use of meshed gears to provide power reduction is not practical in devices of the nature of the invention by reason of the extreme wear incurred from exposure to abrasive particles. It was therefore necessary to utilize another form of reduction drive that would be less subject to wear and deterioration. It is believed the present use of sprockets and chains for this purpose is considerably more practical, at least from the standpoint of wear and, yet, even this structure is subject to considerable wear or damage. Thus, it was not only necessary to provide reduction drives less subject to wear, but also such drives that, when worn, could be easily and quickly removed, repaired, and replaced. It should be apparent from the above description, in conjunction with the drawings, that the drive shaft 33, through chains 28 and 57 and the associated sprockets, transmits power from the source 31 to operate the conveyor 19 and rotate the spreader 82.

In operation, the body 10 is filled with finely particled material, such as lime, and the power unit is set in operation. Although not shown, suitable controls could obviously be provided in the cab of the vehicle on which the body is mounted, or at some other convenient point, in order to give constant control of the operative speed of the power unit and, in consequence, the operative speed of the conveyor and the spreader. When the power unit is in operation, the conveyor causes the material in the body to move rearwardly through a suitable gate 84, from which said material drops onto the rotating spreader. Not only can the power unit be made to operate at a slower or greater rate of speed, but the gate 84 may also be adjusted to control the flow of the material into the spreader.

At such time as wear or breakage may occur in the drive mechanisms of the device, such as chains, sprockets, etc., it is merely necessary to remove the covers 53 and 60 of the housing 51 to gain full access to the chain 57 and sprockets 56 and 59. If the chain has not been broken and is merely loose, or, if broken and needs replacing, the operator of the device will first loosen studs 49. This will free sleeve 42 from its locked position and rotation of the sleeve, due to its eccentric flange 46, will lower the shaft end 33. It will, of course, be understood that the correspond structure which mounts an adjacent portion of the shaft in the housing 34, must also be freed and lowered to the same extent. Although not previously mentioned, a universal 86, located adjacent the end of shaft 33, enables tilting it for this purpose. The chain may now be removed, following which sprocket 56 may be examined and, if necessary, replaced. When the new or repaired chain 57 is again mounted on the sprockets, the sleeves 42 are rotated in a direction to raise the shaft 33, and the chain may be tightened to operative tension and locked in this position by tightening the studs 49.

Should the lower sprocket 59, with which the chain 57 is also engaged, become damaged, access to this sprocket is had by removing the cover plate 60 that forms the forward wall of the lower portion of the enlarged end 58 of the housing 51. Access now is readily had to studs 72 which, when backed off, permit rotation of plugs 69 in a direction to rotate and thereby raise the disk 67. Since the disk 67, through its hub 66, carries the shaft 64 on which sprocket 59 is mounted, said sprocket will be raised to relieve tension of the chain 57, and both chain and sprocket may be examined, repaired and replaced.

It will, of course, be understood that access to sprocket 36 and chain 28 may be had by removal of the forward wall 35 of the housing 34. This wall may be in one or more parts so long as the part in which the shaft 33 is supported may be secured in a rigid operative position to the gear case 27. It will be understood that the details of structure of the housings 34 and 51 are only important to the invention insofar as they provide an adequate enclosure and proper support for the driven shafts and include suitable cover plates by which access to the operative structure may be readily had.

Although applicant has shown and described only one form of his invention, it will be apparent that the driving mechanisms may be altered for adaptation to other spreading devices without in any way affecting the adjustable features of the invention, and that such variations are contemplated as being within the spirit and scope of the invention as set out in the annexed claims.

Having thus set forth my invention, what I claim as new and for which I desire protection by Letters Patent is:

1. In a speed reduction unit having a housing, a drive shaft projecting into said housing and mounting one sprocket of a two sprocket chain drive, bearing means supporting said shaft in said housing, a further shaft, a hub mounting said further shaft, eccentric means securing an annular rim of said hub to said housing, said eccentric means being operable to rotate said hub to change the eccentricity thereof whereby to loosen or tighten a chain that connects the sprockets of said drive.

2. In a speed reduction unit having a housing, a shaft projecting into said housing and mounting one sprocket of a multiple sprocket and chain drive, a combined shaft support and sprocket adjuster comprising a sleeve, an anti-friction bearing secured in said sleeve and supporting said shaft, an eccentric rim on said sleeve, a collar plate, an annular shoulder in said plate receiving and engaging said rim, means locating and securing said plate to said housing and said sleeve against rotation about said shaft, said means being adjustable to release said sleeve and permit rotation thereof about said shaft whereby to radially change the axis of rotation of said shaft and said sprocket.

3. In a speed reduction unit having a housing, a drive shaft projecting into said housing and mounting one sprocket of a two-sprocket chain drive, bearing means supporting said shaft in said housing, a further shaft mounting the other sprocket of said drive, supporting and adjusting means for said further shaft and sprocket comprising a hub through which said further shaft projects, an annular disk integral with said hub, annular openings through said disk arranged equidistant from each other and from the axis of rotation of said further shaft, plugs extending into said openings, studs eccentrically located in and projecting through said plugs into engagement with one wall of said housing, said plugs, upon partial withdrawal of said studs, being rotatable in a direction to move said disk and hub and change the axis of rotation of said further shaft and sprocket.

References Cited in the file of this patent
UNITED STATES PATENTS

| Number | Name | Date |
| --- | --- | --- |
| 844,892 | Pfander | Feb. 19, 1907 |
| 1,880,155 | Ruth | Sept. 27, 1932 |
| 2,081,661 | Dodge | May 25, 1937 |
| 2,340,657 | Goertzen | Feb. 1, 1944 |
| 2,427,470 | Morton et al. | Sept. 16, 1947 |
| 2,517,151 | Weston | Aug. 1, 1950 |